Figure 1:
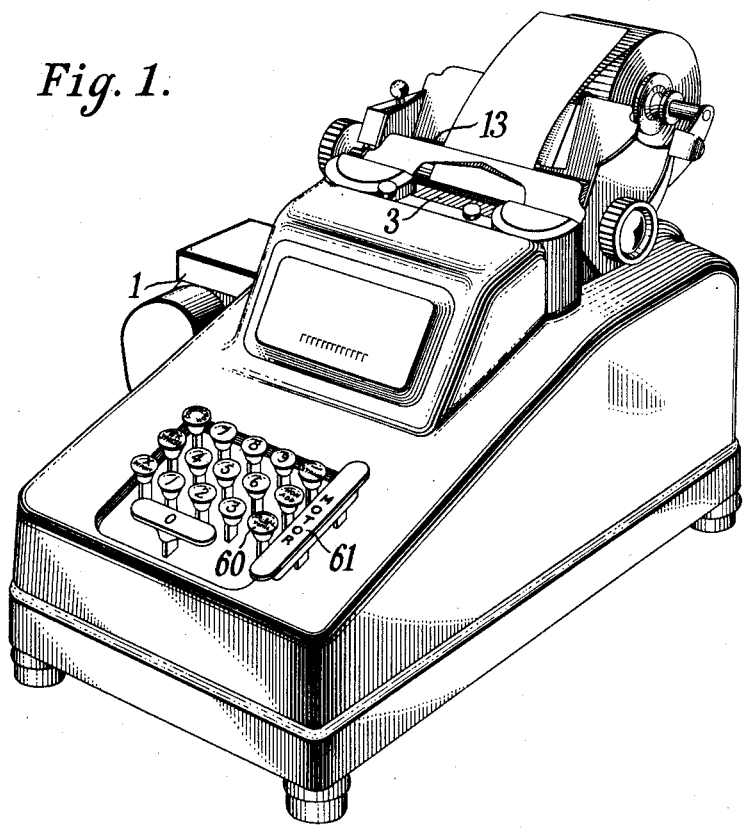

Jan. 12, 1943.                E. MARQUESS                  2,308,292
                             COMPUTING MACHINE
                         Filed April 28, 1939         6 Sheets-Sheet 1

INVENTOR
*Earle Marquess*
BY
*L. G. Julihn*
ATTORNEY

Jan. 12, 1943.  E. MARQUESS  2,308,292
COMPUTING MACHINE
Filed April 28, 1939  6 Sheets-Sheet 2

INVENTOR.
Earle Marquess.
BY L. G. Julihn
ATTORNEY.

Jan. 12, 1943.　　　　E. MARQUESS　　　　2,308,292
COMPUTING MACHINE
Filed April 28, 1939　　　6 Sheets-Sheet 3

INVENTOR.
Earle Marquess.
BY L. G. Julihn
ATTORNEY.

INVENTOR.
Earle Marquess

INVENTOR
Earle Marquess

Jan. 12, 1943.  E. MARQUESS  2,308,292
COMPUTING MACHINE
Filed April 28, 1939  6 Sheets-Sheet 6

INVENTOR.
Earle Marquess.
BY L. G. Julihn
ATTORNEY.

Patented Jan. 12, 1943

2,308,292

UNITED STATES PATENT OFFICE 2,308,292

COMPUTING MACHINE

Earle Marquess, Covington, Ky., assignor to Underwood Elliott Fisher Company, New York, N. Y., a corporation of Delaware Application April 28, 1939, Serial No. 270,482

6 Claims. (Cl. 235—60)

This invention relates to adding machines, and more particularly to automatic cycling mechanism therefor.

The primary object of the invention is to provide a construction whereby operation of a single manipulative member, such as a total key, immediately following the setting up of an amount on the keyboard, will cause the machine to operate through three cycles; the first cycle accumulating the amount set up on the keyboard, the second cycle preparing the machine for the taking of a positive or negative total, and the third cycle resetting the totalizer and printing the total on the work sheet.

With this and incidental objects in view, the invention consists in certain novel features of construction and combinations of parts, the essential elements of which are set forth in appended claims, and a preferred embodiment of which is hereinafter described with reference to the drawings which accompany and form part of the specification.

Figure 2:
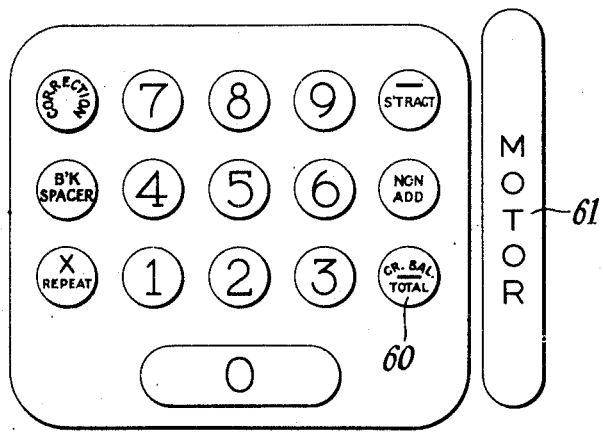
Figure 3:
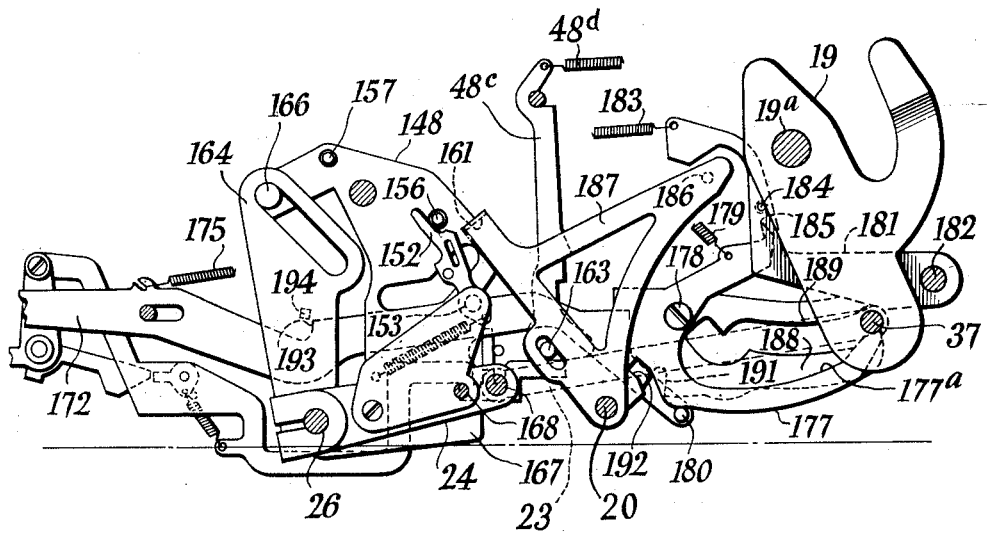
Figure 4:
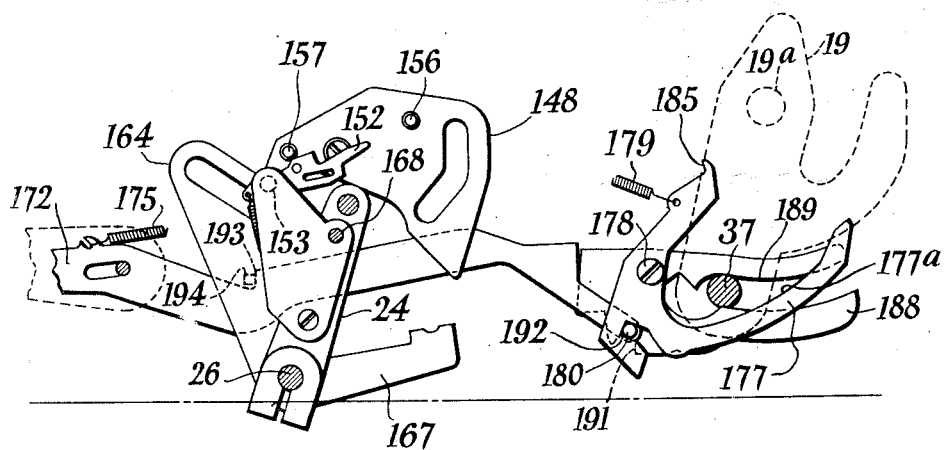
Figure 5:
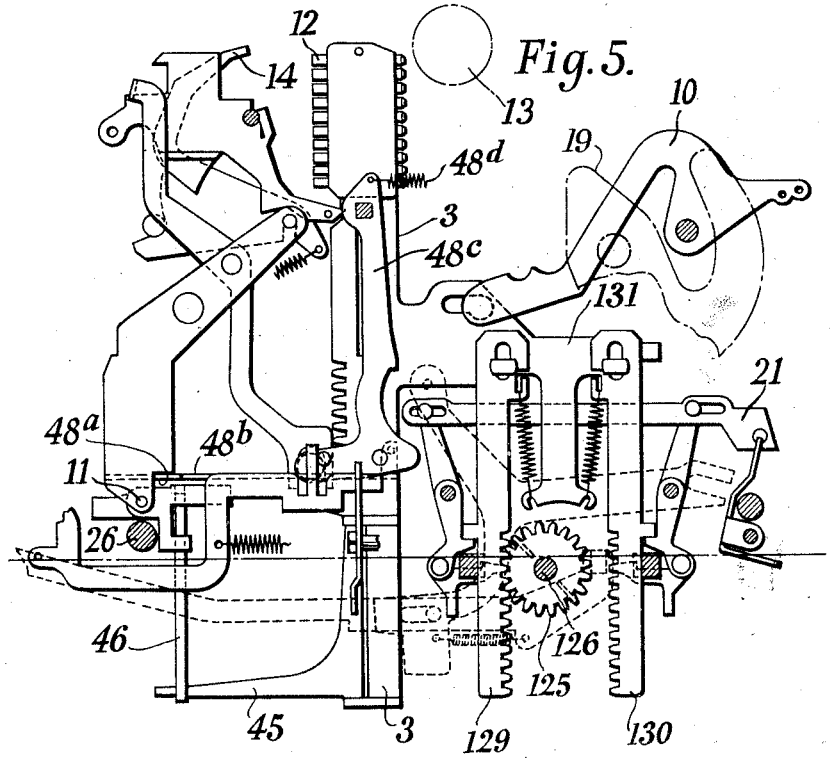
Figure 6:
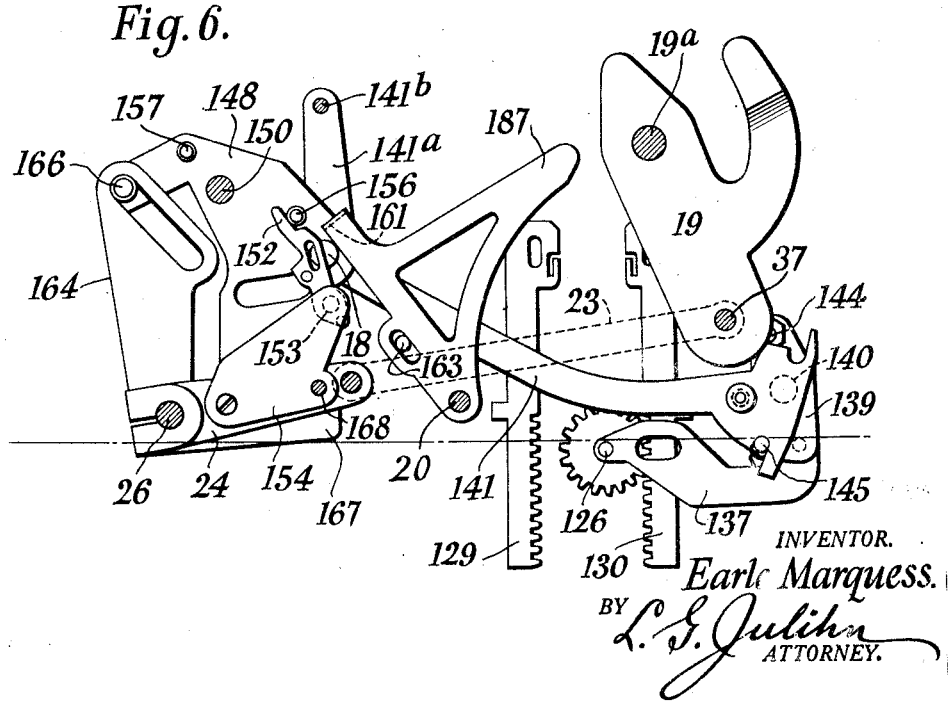
Figure 7:
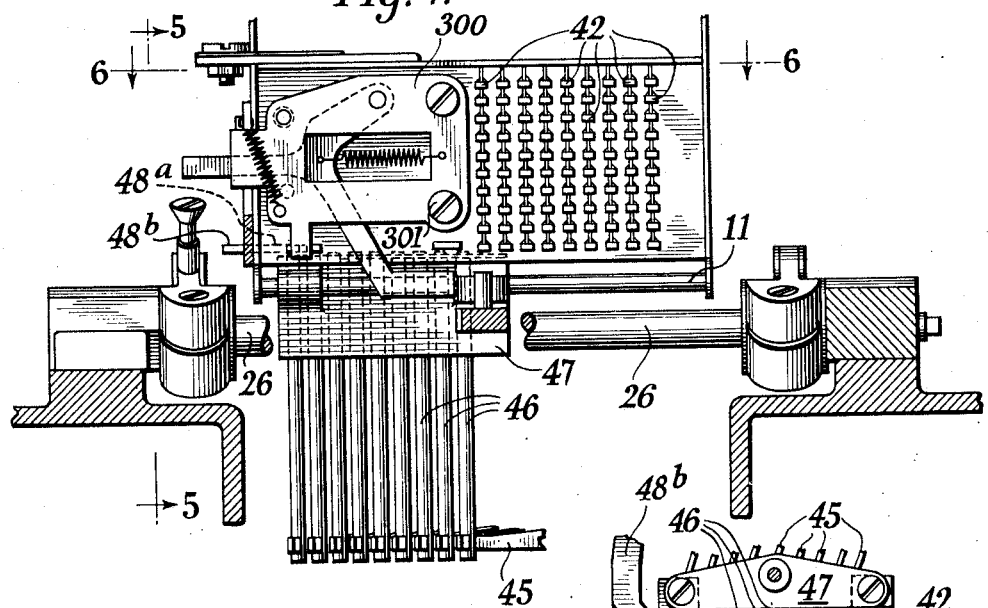
Figure 9:
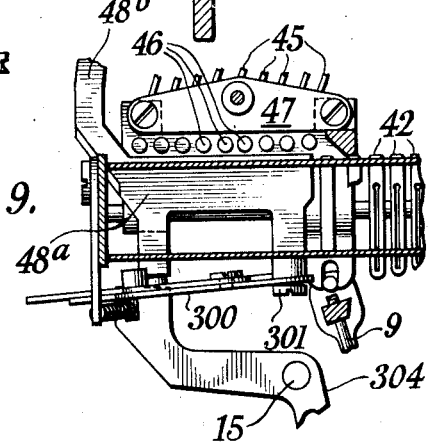
Figure 8:
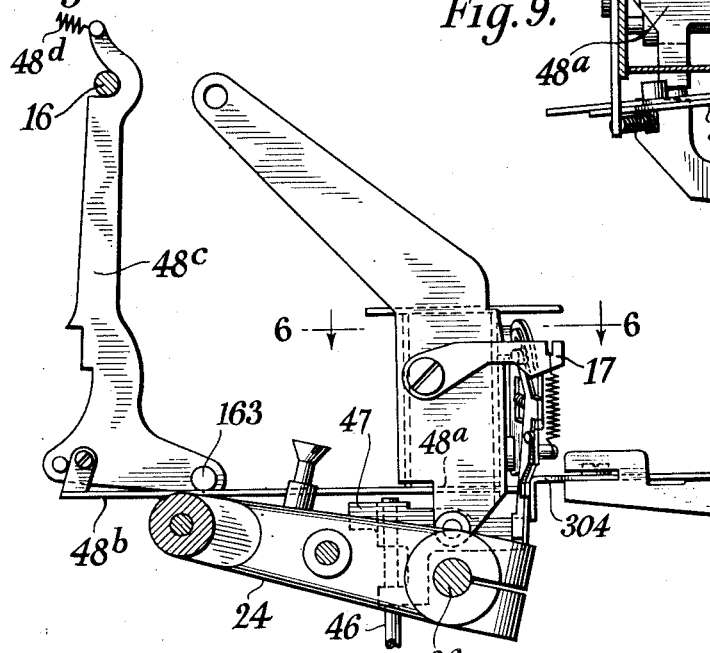
Figure 10:
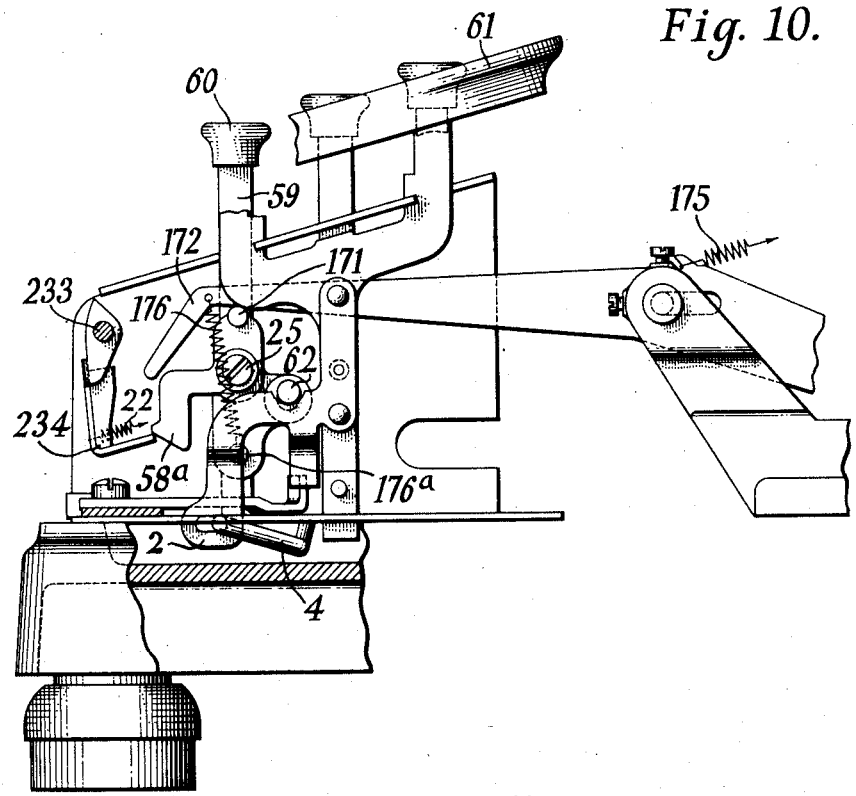
Figure 11:
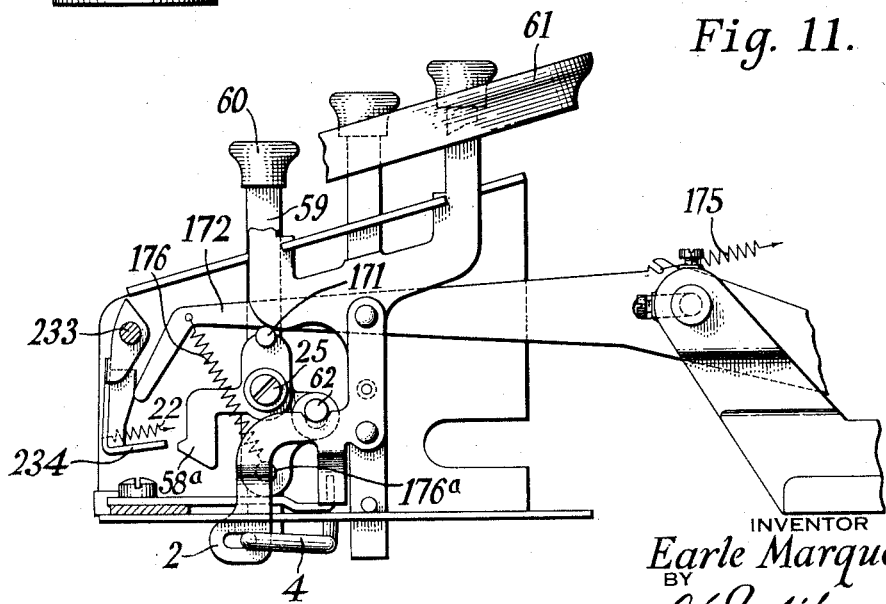
Figure 12:
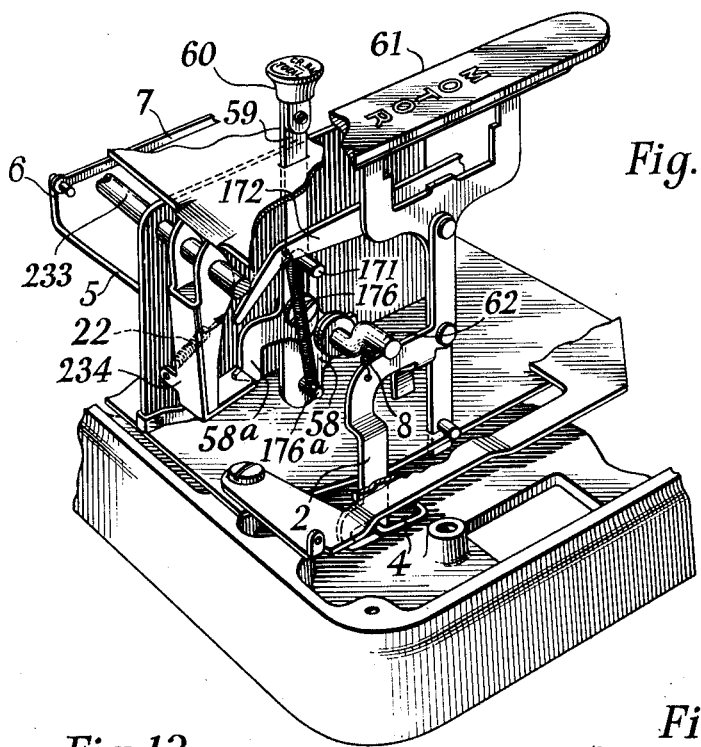
Figure 13:
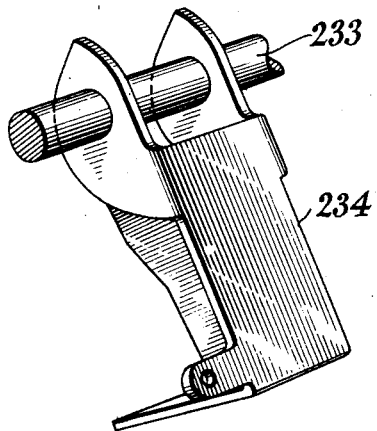
Figure 14:
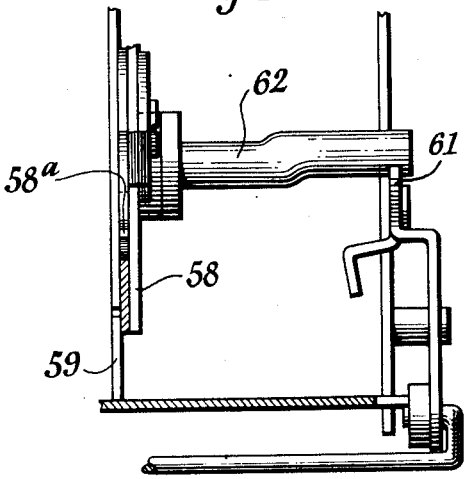

In the drawings:

Figure 1 is a perspective view of an adding machine on which the invention is adapted to be used, Figure 2 is a diagrammatic view of the keyboard thereof, Figure 3 is a fragmental right side elevation of a machine embodying the features of my invention, the parts being shown in the positions occupied after the entry of an amount in the keyboard of the machine, Figure 4 is a view generally similar to Figure 1 with some of the parts omitted, and the mechanism occupying an intermediate position, in the course of an operation, Figure 5 is a fragmental right side elevation of the machine, showing the type bars and related parts, Figure 6 illustrates the means employed to control engagement of the register with its actuating racks, Figure 7 is a fragmental front elevation of parts of the mechanism to control the differential movement of the type bars, and parts of the mechanism to enforce a blank cycle before taking a total, Figure 8 is an enlarged left side elevation of certain of the mechanism illustrated in Figure 7, Figure 9 is a fragmental plan view of some of the structure shown in Figure 7, Figure 10 is a right side elevation of the motor bar and total key structure, Figure 11 is a view similar to Figure 10 but showing the parts in the position occupied just after the total key latch is released, but before the total key is allowed to rise, during a total taking cycle, Figure 12 is a perspective view of the motor bar and total key, together with their related connections, and Figures 13 and 14 are enlarged detail views of certain of the parts shown in Figure 12.

The invention is disclosed in connection with a machine of the character disclosed in United States Patents Nos. 1,198,487, 1,583,102, 1,925,735, 1,934,747, 1,965,611 and 2,088,982.

Operating mechanism

The machine is operated by an electric motor 1 (Figure 1) through a suitable clutch such as disclosed in Patent No. 1,925,735 connecting the motor with a main drive shaft 26 (Figures 3, 4, 6 and 8). Operation of the motor is controlled by a motor bar 61 (Figure 12) having an extension 2 connected to an arm 4 of a rod 5 extending across the front of the machine (see also Patent No. 1,925,735). An upwardly directed arm 6 of rod 5 is connected to a link 7 extending to the rear of the machine, where it controls the engaging and disengaging of the clutch and the starting and stopping of the motor.

By these parts, depression of motor bar 61 against the tension of a spring 8 causes the machine to operate through one cycle. However, if the motor bar is held depressed so that the tension of spring 8 is not effective to return it, and parts 2, 5 and 7 at the end of the operation, the machine continues operating so long as the motor bar is held depressed.

Operation of the motor causes the drive shaft 26 to oscillate counter-clockwise, then clockwise (Figure 3), once during each machine cycle.

Indexing, differential and printing mechanisms

The following mechanisms are similar to the corresponding mechanisms disclosed in Patents Nos. 1,583,102 and 1,965,611, so that explanation thereof will be made only in a general way.

Amounts to be entered in the machine are indexed on the amount keys (Figure 1), which, through a vertical row of horizontally disposed push pins 9 (Figure 9), set index pins 42 to the rear a distance sufficient for their rear ends to lie in the plane of a series of rods 46 (Figures 5, 7 and 9). Rods 46 are slidable vertically in a frame 47, in turn slidable along a rod 11 (Figure 7) from left to right in the machine. Rods 46 are connected, at their lower ends, to arms 45, pivoted to type bars 3 mounted for vertical movement in the machine. A series of type 12 are carried by each type bar to cooperate with a platen 13 to print amounts and totals. A series of hammers 14 and their customary controls are provided to effect printing. Two sets of racks 129 and 130 are suspended from arms 131 extending rearwardly from type bars 3, to actuate a totalizer having a series of pinions 125 mounted on a shaft 126. The type bars and actuating racks are raised and lowered by levers 10 connected to type bars 3, levers 10 in turn being actuated by drive shaft 26 (Figure 6). The connection between shaft 26 and levers 10 includes arm 24, a link 23 pivoted to arm 24 and to a rod 37 connecting two similar levers 19 pivoted on a rod 19ᵃ. Levers 19 are flexibly connected to levers 10 by parts fully disclosed in Patent No. 1,965,611.

As the amount keys are depressed, a suitable escapement causes frame 47 to move from left to right (Figures 7 and 9) one step for each amount key depressed, placing rods 46, one at a time, beneath the set pins 42. Also, the push pins move from left to right with frame 47, so that only one pin 42 in each vertical row may be set.

As the first amount key is depressed, a suitable connection moves lever 304 (Figure 9) clockwise about its pivot 15 to move a plate 300 clockwise (as viewed in Figure 9) a slight extent about its pivot 301. Movement of plate 300 clockwise (rearwardly in the machine) moves the forward end 48ᵃ of a plate 48ᵇ rearwardly in the machine. As shown in Figure 8, plate 48ᵇ is pivotally connected to a frame 48ᶜ composed of two similar members, one on each side of the machine, pivoted on a rod 16 and connected by a rod 163 for uniform movement. A spring 48ᵈ tends to move plate 48ᵇ forward, but is prevented, by a spring detent 17, from doing so after it is moved rearwardly by plate 300.

Rearward movement of plate 48ᵇ places the end 48ᵃ (Figure 9) above rods 46, so that during the printing of an item only the rods that are moved to the right of the plate are permitted to rise during the machine cycle. In this manner, only the type bars necessary to print the digits of an indexed number are allowed to rise from their zero positions.

*Totalizer engaging and disengaging mechanism*

To engage and disengage the totalizer with the actuating racks 129 and 130, shaft 126 (Figure 6) is moved forwardly and rearwardly in the machine (left and right in Figure 6). To shift the totalizer in this manner, arm 24 carries a plate 154 having pivoted thereto at 153 a pawl 152. This pawl engages studs 156 and 157 on the initial and return strokes of the drive shaft to oscillate a plate 148 carrying studs 156 and 157, first counter-clockwise, then clockwise during each machine cycle. Oscillation of plate 148 moves a stud 18, embraced by a cam slot in plate 148, and a link 141 to the left and then to the right, stud 18 being carried by a link 141ᵃ pivoted at 141ᵇ, and connecting the forward end of link 141 with link 141ᵃ. Link 141 at its rear end has two notches to cooperate with two studs 144 and 145 on one of two similar levers 139 secured to a shaft 140 journaled in the machine frame. Two identical links 137 connect levers 139 with the totalizer shaft 126. During adding operations, link 141 is connected with stud 145, so that movement of link 141 to the left, at the beginning of an operation, moves the totalizer from the position shown in Figure 6, where it is engaged with the adding racks 130, to its disengaged position, where it lies midway between racks 129 and 130. Movement of link 141 to the right at the beginning of the second half of the cycle returns the totalizer to the position shown in Figure 6.

Depression of the subtraction key (Figure 1), by connections disclosed in Patent No. 1,965,611, tensions the rear end of link 141 upwardly, so that when it is given its movement to the left at the beginning of an operation, the upper notch in the link engages stud 144. The subsequent movement of link 141 to the right thereupon moves the totalizer into engagement with racks 129 for subtracting.

The same parts are used for engaging and disengaging the totalizer with the actuating racks for taking both positive and negative totals, with the exception, however, that a cam plate 164, loosely pivoted on drive shaft 26, cooperates with a roller 166 on plate 148 to disengage the totalizer, and a stud 168 cooperates with an arm 167 of cam plate 164 to engage the totalizer at the end of the operation, as will be explained in detail later.

*Adding and subtracting*

To add, an item is indexed on the keyboard and the motor bar depressed. Oscillation of drive shaft 26 (Figure 6), through pawl 152 and stud 156, disengages the totalizer from the actuating racks. During the remainder of the first half of the cycle, type bars 3 (Figure 5) rise differentially under control of the index pins 42 (Figures 7 and 9), actuating racks 129 and 130 rising with the type bars. At the beginning of the last half of the cycle, pawl 152 (Figure 6) engages stud 157, returning plate 148, link 141, lever 139, link 137 and the totalizer to their position shown in Figure 6, where it is engaged with the adding racks 130. During the remainder of the last half of the cycle, the type bars and actuating racks are lowered to the position shown in Figure 5, entering on the totalizer the amount indexed on the keyboard.

For subtracting, the same movements take place except that at the beginning of the last half of the cycle, due to the fact that the rear end of link 41 is tensioned upwardly by depression of the subtract key, the link is engaged with stud 144 instead of stud 145, engaging the totalizer with subtracting racks 129. This rotates the totalizer in the opposite direction, causing the number indexed on the keyboard to be subtracted from the totalizer.

*Means of enforcing a blank cycle before taking a total*

In order that any of the parts of the transfer mechanism that were tripped during the last accumulating operation may be restored, and in order that the totalizer may be engaged with the proper set of racks 130 or 129 for taking a positive or negative total, a means is provided for enforcing a blank cycle before a total can be taken. To do this, it is only necessary to hold all the rods 46 (Figures 5, 7, 8 and 9) against rising during the cycle. This is accomplished by leaving the end 48ᵃ of plate 48ᵇ, at the end of an accumulating operation, in its rear position where it overlies rods 46, it being remembered that depression of the first amount key in indexing an amount moves plates 300 and 48ᵇ into their rear positions. With plate 48ᵇ in its rear position, if no amount keys are depressed, all the rods 46 lie under the plate, so that during operation of the machine the type bars are held from rising.

During such a blank operation, as explained in Patent No. 1,583,102, plate 48ᵇ is moved forwardly to its position shown in Figure 9, so that a total can be taken in the following operation.

Taking a total

In taking a total, the total key 60 is depressed. Depression of this key, through its stem 59 (Figure 12), depresses a plate 58 secured thereto. A bar 62, secured to plate 58 and overlying link 2, causes depression of the total key to simultaneously depress the motor bar 61 and start the machine.

Depression of total key 60 also lowers a stud 171, connected thereto, from its position directly beneath a lever 172, and stretches a spring 176 connected to lever 172 and to a stud 176ª on plate 58.

Movement of plate 48ᵇ forwardly to its position shown in Figure 9, during the preceding blank cycle, moved frame 48ᶜ (Figures 3 and 8) forward with it. Referring to Figure 3, forward movement of frame 48ᶜ, through rod 163, moved a lever 187 counter-clockwise about its pivot 20 by reason of the end of rod 163 lying within a slot in lever 187. This movement of lever 187 caused a flange 161 thereon to strike pawl 152, and moved it sufficiently to prevent it from cooperating with stud 156 at the beginning of the total taking operation. Therefore, the totalizer remains engaged with the actuating racks during the first portion of the operation, allowing the actuating racks and type bars to be moved differentially under control of the totalizer wheels.

To disengage the totalizer after the wheels are returned to zero by the differential upward movement of the racks, the following mechanism is provided to move plate 148 (Figure 3) counter-clockwise by counter-clockwise movement of cam plate 164, as mentioned above, at the beginning of the second half of the total taking cycle.

A cam lever 188, having a slot 189 and pivoted at 178, embraces rod 37 and is provided on its lower edge with a notch 191 (Figure 4). Another cam lever 177 also is pivoted at 178 and is tensioned counter-clockwise by a spring 179. Lever 177 has a cam edge 177ª that bears against the lower side of rod 37 under the tension of spring 179 and has a short cam slot 192, in its lower edge, and a hook 185 at its upper end. A lever 181 (Figure 3) is pivoted on a rod 182 and is tensioned counter-clockwise by a spring 183, the counter-clockwise movement of the lever being controlled by rod 37 upon which the lower edge of the lever rests. Lever 181 carries a stud 184, which normally lies out of the path of hook 185.

During accumulating operations and during the blank cycle preceding a total taking cycle, in other words, during the operations in which frame 48ᶜ is in its rear position, as shown in Figure 3, a stud 186 on lever 187 lies in its rear position shown in Figure 3. During these operations, the forward movement of rod 37, during the first half of the machine cycle, allows lever 181 to move a sufficient distance counter-clockwise to bring stud 184 into the path of hook 185. Then upon rod 37 reaching its forward extremity, where it moves lever 188 counter-clockwise, because of the configuration of the left end of cam slot 189, notch 191 is placed directly above a stud 180 secured to the rear end of lever 172 and resting on the lower edge of lever 177. However, since stud 184 is in the path of hook 185, lever 177 is held against any substantial counter-clockwise movement from its position shown in Figure 3. Stud 180, therefore, does not rise into notch 191, but remains held in its lower position by lever 177. Lever 172 is thereby held against operation during these cycles if the total key 60 is depressed, tensioning spring 176 (Figures 10, 11 and 12) and thereby tensioning lever 172 counter-clockwise.

During a total taking cycle, however, frame 48ᶜ and lever 187 (Figure 3) are in their forward positions where stud 186 lies directly under the forward end of lever 181. Therefore, as soon as rod 37 begins its forward movement, lever 177 begins moving counter-clockwise, and since the total key 60 is depressed, spring 176 is stretched, tensioning stud 180 upwardly toward the lower edge of lever 188. As rod 37 completes its forward movement, lever 188 moves counter-clockwise, as mentioned above, placing notch 191 above stud 180. Since lever 177 has moved counter-clockwise, stud 180 is permitted to rise into notch 191, whereupon further counter-clockwise movement of lever 177 moves slot 192 therein into engagement with stud 180, locking the stud in notch 191. This rising of stud 180 is accompanied by a sufficient rising of the rear portion of lever 172 to place a shoulder 193 thereon immediately behind a stud 194 on cam plate 164.

During the first part of the return movement of shaft 26, rod 37 moves lever 188 clockwise to its position shown in Figure 4, moving stud 180 and lever 172 forwardly. This causes shoulder 193 to move stud 194 and cam plate 164 forwardly, moving plate 148 counter-clockwise, as desired, to disengage the totalizer from the actuating racks before they are lowered to their normal positions. The totalizer now stands at zero.

During the remainder of the return movement of shaft 26, rod 37 is moved to the rear, moving lever 177 clockwise to its position shown in Figure 3. This cams stud 180 downwardly out of notch 191, whereupon a spring 175, connected to lever 172, pulls the lever and stud 180 to the rear to their positions shown in Figure 3. During the last portion of the return movement of shaft 26, stud 168, extending through arm 24, strikes arm 167 of cam plate 164, and moves the plate clockwise, moving plate 148 clockwise to its position shown in Figure 3, and leaving the totalizer engaged with the actuating racks at the end of the operation.

Taking a negative total

Referring to Figure 5, an overdraft mechanism, generally designated at 21, is provided to add the customary "fugitive one" into the totalizer whenever it passes through zero. This mechanism also controls the operation of parts that engage the subtracting racks 129 with the totalizer during a blank cycle whenever the totalizer is overdrafted, so that during a total taking operation a correct negative total will be taken. This mechanism is fully disclosed in Patent No. 2,088,982.

Three cycle operation by depression of total key

The customary procedure in adding the last one of a list of items, and taking a total, is to index the item on the amount keyboard, press the motor bar to accumulate the item, and either hold the motor bar depressed or re-depress it for a second cycle. The total key is then depressed and the motor bar again depressed to take the total.

To shorten this procedure, mechanism is herein provided that makes it possible to obtain the above result simply by depressing the total key after the last item is indexed on the amount keyboard, the machine thereupon accumulating the last item, operating through the blank cycle and taking the total, in three uninterrupted operations, at the end of which the total key rises and the machine stops.

The mechanism for accomplishing this result includes the above described plate 58 (Figure 12) and bar 62 that causes depression of the total key to depress the motor bar 61. Further, a detent 234, pivoted on a rod 233 and tensioned counter-clockwise by a spring 22, is provided to engage a hook 58ª, secured to stem 59 of total key 60 by a screw 25 and by stud 171, to hold the total key depressed.

By these parts, depression of the total key, after the last item is indexed on the amount keyboard, stretches spring 176 to tension the rear end of lever 172 upwardly, and depresses the motor bar to start the machine, hook 58ª catching under detent 234 to hold the total key depressed. During the first ensuing cycle the indexed amount is accumulated in the totalizer. Then, since total key 60 and motor bar 61 are still held in their depressed positions, the machine immediately operates through a blank cycle. Although the total key is depressed, the total is not taken during this cycle because of the above described mechanism for enforcing a blank cycle before total taking. It might also be noted that during these two cycles the totalizer engaging mechanism operates, as in ordinary accumulating operations, under control of pawl 152 (Figure 3), since frame 48ᶜ and lever 187 are in their rear positions shown in this figure, where flange 161 does not disable pawl 152 and where stud 186 is not in a position to prevent stud 184 from engaging with hook 185. During the third cycle, the total is taken in the manner explained above, the forward end of lever 172 striking detent 234 and moving it forward at the beginning of the second half of the cycle when lever 172 is moved by lever 188. This releases the total key and motor bar to allow the machine to come to rest at the end of the third cycle.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described, a totalizer, actuating racks therefor, a manipulative member, means for holding the manipulative member in operated position, means for disengaging the totalizer from the actuating racks during a total taking operation, and means operated by the disengaging means for releasing the manipulative member from its operated position.

2. In a machine of the class described, a totalizer, item entering means including amount keys, machine operating mechanism, cycle initiating means including a manipulative total control member, and means controlled jointly by operation of an amount key and of the manipulative control member to cause the machine operating mechanism to effect three cycles of operation uninterruptedly, when cycling is initiated by operation of said manipulative member directly following operation of an amount key, the three cycles consisting of an item entering operation followed by a two cycle totaling operation.

3. In a machine of the class described, a totalizer, item entering means including amount keys, machine operating mechanism, cycle initiating means including a manipulative total control member, and means controlled jointly by operation of an amount key and of the total control member to cause the machine operating mechanism to cycle continuously to effect an item entering operation under control of the amount keys followed by a total taking operation under control of said total control member, when cycling is initiated by operation of the total control member directly following operation of an amount key.

4. In a machine of the class described, a totalizer, item entering means including amount keys, machine operating mechanism, cycle initiating means including a manipulative total control member, means controlled by operation of the total control member to initiate a two cycle operation of the operating mechanism to effect total taking, and means controlled jointly by operation of an amount key and of the total control member to cause a continuous three cycle operation of the operating mechanism to effect an item entering operation followed by a total taking operation, when cycling is initiated by operation of the total control member directly following operation of an amount key.

5. In a machine of the class described, a totalizer, amount keys, machine operating mechanism, cycle initiating means including a manipulative total control member, means to retain the total control member in operated position at the end of one cycle, so that one or more additional cycles may follow immediately, means for restoring the total control member during the second cycle following operation thereof, when such operation of the total control member was not immediately preceded by operation of an amount key, and means controlled jointly by operation of an amount key and of the total control member for restoring the total control member during the third cycle instead of the second following operation thereof, when such operation was directly preceded by operation of an amount key.

6. In a machine of the class described, a totalizer, amount keys, machine operating mechanism, cycle initiating means including a manipulative total control member, means for holding the manipulative control member in operated position, means for releasing the manipulative control member from its operated position during a predetermined cycle, and means controlled by the amount keys when the latter are operated directly prior to operation of the manipulative member, for causing operation of the releasing means one cycle later.

EARLE MARQUESS.